Oct. 24, 1933.  J. FAILLERS  1,931,982
FOOD CUTTER
Filed April 20, 1931  2 Sheets-Sheet 1
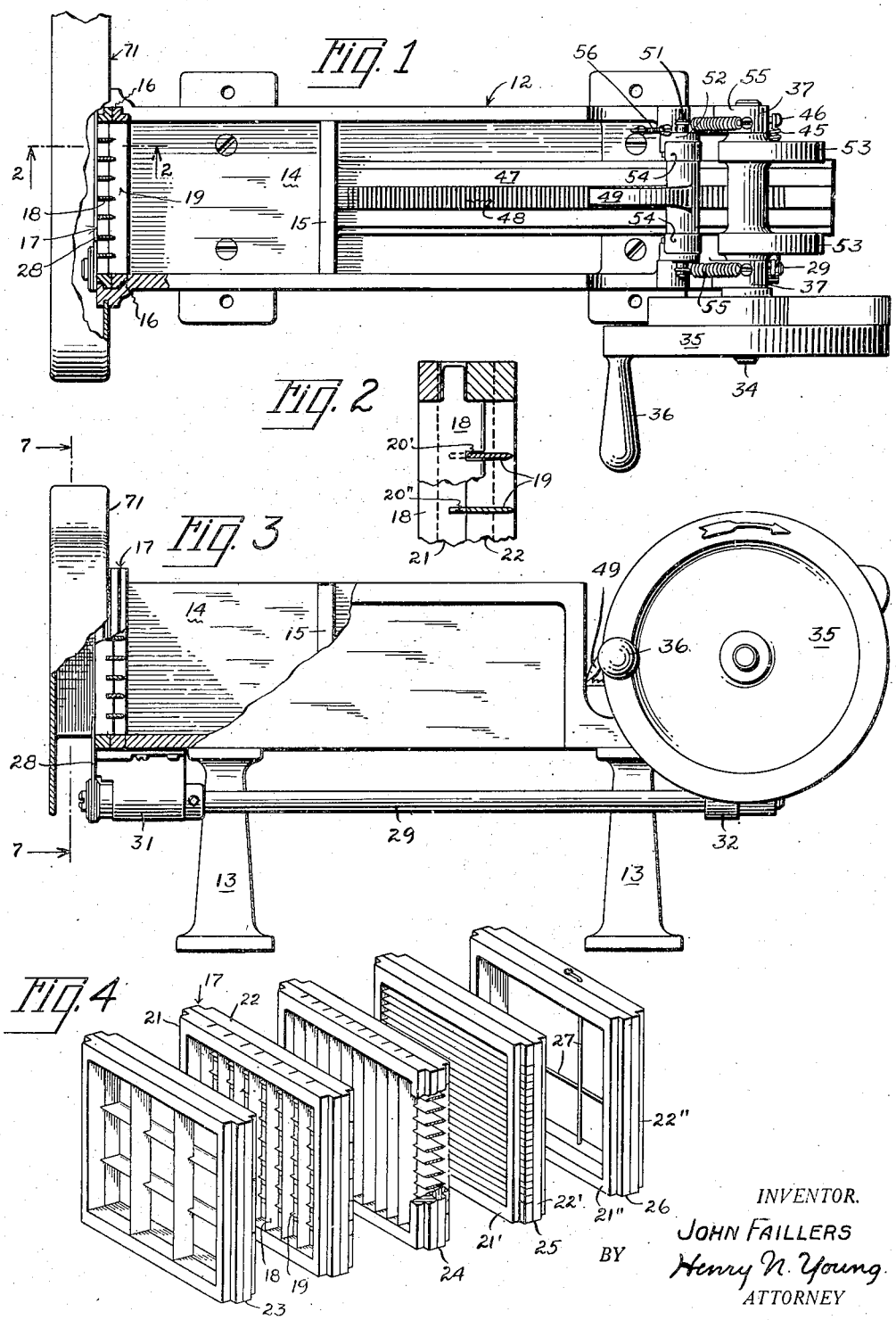
INVENTOR.
JOHN FAILLERS
BY Henry N. Young
ATTORNEY Oct. 24, 1933.  J. FAILLERS  1,931,982
FOOD CUTTER
Filed April 20, 1931  2 Sheets-Sheet 2
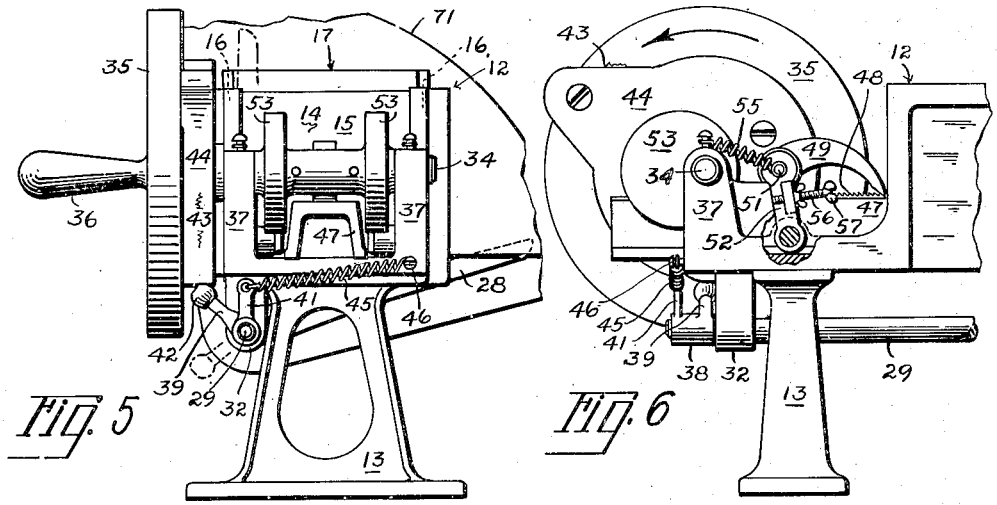
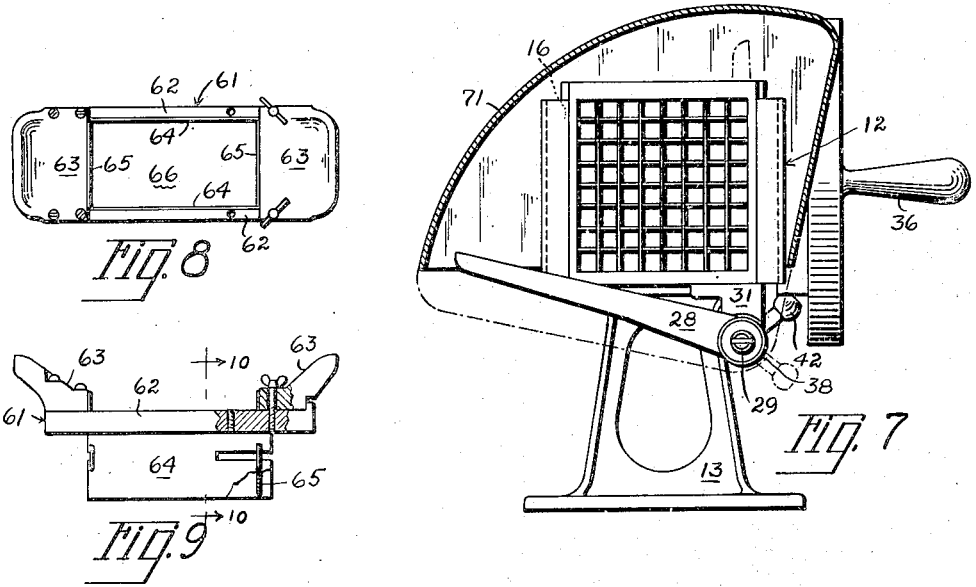
INVENTOR.
JOHN FAILLERS
BY Henry N. Young
ATTORNEY Patented Oct. 24, 1933

1,931,982

UNITED STATES PATENT OFFICE 1,931,982

FOOD CUTTER

John Faillers, Oakland, Calif.

Application April 20, 1931. Serial No. 531,309

2 Claims. (Cl. 146—169)

The invention relates to a device for cutting certain food materials into pieces of predetermined shape as part of the process of preparing the food for consumption.

An object of the invention is to provide for cutting the food into rectangular pieces of like shape and size.

Another object of the invention is to provide a device of the character described whereby considerable quantities of the food may be operated on in a cleanly and expeditious manner.

A further object of the invention is to provide a cutter structure of the class described to have a minimum number of working parts.

Yet another object of the invention is to provide for the production of food pieces of different sizes at the will of the operator.

The invention possesses other objects and features of advantage which, with the foregoing, will be set forth or be apparent in the following description of typical embodiments of the invention which are illustrated in the accompanying drawings, in which, Figure 1 is a plan view of a cutter structure embodying the invention, certain parts thereof being broken away to disclose features of internal structure.

Figure 2 is an enlarged fragmentary section through a cutting screen of the device and taken at 2—2 in Figure 1.

Figure 3 is a front elevation of the cutter, a portion of the structure being broken away.

Figure 4 presents perspective views of a number of cutter screens for alternative use in the apparatus.

Figure 5 is an end elevation of the cutter.

Figure 6 is a fragmentary back elevation of the structure.

Figure 7 is a sectional view at the line 7—7 in Figure 3.

Figure 8 is a plan view of a shaper member for preparing food to be operated on in the cutter.

Figure 9 is a side elevation of the shaper member, portions of the structure being broken away.

Figure 10 is a section at 10—10 in Figure 9.

Figure 11 is a perspective view of one element of the shaper member.

As particularly illustrated, the cutter of my invention comprises a body member 12 supported on legs or standards 13 and carrying the various operative parts of the device. The member 12 is formed to provide a trough-like cavity 14 extending longitudinally therealong and opening upwardly, and said cavity is of uniform section transversely thereof. A plunger 15 is slidably fitted in the trough for movement therealong to propel uncut food through the trough and toward food cutting means provided at one end of the trough.

At one extremity of the member 12, which may hereafter be referred to as the forward end of the member and of the trough, opposed vertical guideways 16 are provided in the trough walls for receiving a cutter screen 17. The screen 17, it is noted, comprises sets of vertical and horizontal cutter blades 18 and 19 respectively, said blades presenting sharpened edges toward the plunger 15. Preferably, and as shown, the different sets of blades are respectively mounted in independent and complementary sections 21 and 22 of the screen frame, said sections being transversely separable.

The cutter blades are arranged to be operative by and upon the pressure of food thereagainst by means of the plunger 15. Accordingly, the blades must be relatively thin and the blade sets are arranged for an interlocked engagement to prevent an undue transverse flexure of the blades while they are operative. As particularly brought out in Figure 2, the vertical blades 18 are provided with slits 20' extending from their cutting edges and arranged to more or less tightly receive the back edges of the cutter blades 19 while engaging in slits 20'' of the latter blades when the frame sections 21 and 22 are engaged in back-to-back relation as shown. The described interlocking of the cutter blades constitutes, in the present instance, the sole means for holding the screen sections 21 and 22 together when the screen 17 is removed from its position in the guideways 16, it being noted that the guideways 16 are also operative to secure the sections together when the screen is mounted in its place.

The present device is particularly designed for cutting a variety of food into pieces of various shapes and sizes, and since the spacing of the cutter blades in part determines the dimensions of the food pieces, a variety of cutter screens is preferably provided with the machine. As particularly disclosed in Figure 4, not only is the cutter screen 17 shown in perspective, but screens 23, 24, 25 and 26 are also shown as illustrating certain variations of screen structure which operate essentially as does the screen 17. In the screen 23, it is noted that fewer cutter blades are utilized whereby to produce food pieces of larger section transversely of the trough as the food is pressed through the screen. In the screen 24, on the other hand, more cutter blades are utilized whereby food pieces of smaller size may be produced. The screen 25 provides only horizontal blades in a section 22' thereof, the other section 21' having no blades; in this manner the screen 25 is arranged to produce relatively thin sheets of the food material. In the screen 26, the cutting elements are wires 27 carried by a section 22'', the other section 21'' carrying no cutter elements, and said screen is particularly designed for use in cutting a square of butter into the usual pats by means of the machine.

Means are provided for transversely cutting the strips of food as they emerge from the cutter screen, and as particularly shown, said means comprises a knife blade 28 mounted for oscillating movement in a plane at the forward end of the trough 14 and along the forward face of the cutter screen thereat. The knife 28 is particularly shown as demountably fixed at the forward end of a rock-shaft 29 journalled in hanger members 31 and 32 which depend from the body 12 toward the front side thereof, said shaft extending longitudinally of the cutter body. The knife 28, it is noted, is arranged for movement upwardly and forwardly during an operative traverse thereof, the normal inoperative position of the knife being particularly brought out in Figure 7, and obtaining in the other views of the structure. Means are provided for resiliently urging said inoperative disposal of the knife at all times, said means being hereinafter described.

It will now be noted that both the pressing of the food through the cutter screen 17 and the actuation of the knife 28 are arranged to be effected continually and in proper sequence through a continuous manual or power rotation of an horizontal shaft 34 journalled in the body 12 adjacent the rear end thereof, said shaft extending transversely of the body and carrying a flywheel 35 at an end thereof which extends from the front of the body. In the present embodiment of the invention, a crank handle 36 protrudes from the flywheel 35 for use to manually effect a rotation of the shaft 34. As particularly shown, the side walls of the trough 14 terminate somewhat forwardly of the rearward end of the trough and the shaft 34 is journalled in ears 37 which extend upwardly from the trough bottom at its extremity.

Mounted on the extremity of the shaft 29 rearwardly of the hanger 32 is a member 38, said member providing radial arms 39 and 41 fixedly related to each other and to the shaft. The arm 39 is formed at its free end with a ball 42 and said ball is arranged to constantly engage the working edge 43 of a cam 44 of the shaft 34, which cam is conveniently mounted on the flywheel 35 for rotation therewith and with the shaft. The operative relation of the ball and cam edge 43 is such that as the shaft 34 is rotated, the shaft 29 is periodically rocked to effect a traverse of the knife 28 in its described working plane at the forward end of the trough cavity. A tension spring 43 connects the free end of the arm 41 with a screw-pin 46 mounted at the trough extremity, said spring being constantly and yieldingly operative to urge a maintenance of the knife in its inoperative position and to constantly hold the ball 42 against the cam face 43.

Means are provided for periodically advancing the plunger 15 to a fixed and adjusted degree. As particularly shown, a stem or push-rod 47 extends rearwardly from the plunger and along the trough bottom, said stem being slidably supported in the structure whereby to hold the plunger in its operative position. The upper side of the stem 47 is formed to provide a rack 48 against which a pawl 49 is operative as a propelling means for the stem and plunger. In the present structure the pawl 49 is pivotally carried on a shaft 51 and the latter shaft is in turn carried at the ends of like arms 52 extending upwardly from the trough bottom at opposite sides of the stem 47 and pivoted to said trough bottom for movement about a common axis.

The pawl 49 is arranged to maintain contact with the rack 48 by reason of the weight thereof, and its operative relation to said rack is such that in its movement rearwardly along the rack it passes over one or more of the teeth. When the pawl is moved forwardly it engages behind a rack tooth for advancing the rack and plunger in accordance with its degree of forward movement. The pawl shaft 51 and arms 52 cooperatively provide a U-shaped carrying frame for the pawl whereby the pawl is understood to be mounted for oscillation about an axis eccentric and parallel to its pivotal axis.

A cam means in the form of a pair of eccentric discs 53 is provided on the cam shaft 34 for periodic and like engagement with the pawl-supporting frame for rocking the same. As particularly shown, sleeve rollers 54 are mounted on the pawl shaft 51 at opposite sides of the pawls for operative engagement with the cams 53 at the appropriate time in an operative cycle of the cams to effect a working movement of the plunger 15. It will be understood that both cam discs 56 function alike, and that either alone would operate the pawl.

A tension spring 55 is operative between the pawl-carrying frame and ear 37 for yieldingly urging the disposal of the pawl in a limiting rearward position thereof. An adjustable stop means is provided whereby said rearward disposal of the cam may be adjustably regulated; as shown said means comprises a stop pin 56 threadedly engaged through an arm 52 to have an end thereof engage an ear 37 to limit said rearward movement of the pawl. The pin 56 is preferably provided with a winged head 57 to facilitate its manual adjustment. With the stop pin in use, the relation of the cams 53 to the rollers 54 is generally such that said rollers are engaged by the cams only during a portion of a rotative cycle of the cams, the period of contact being variable in accordance with the setting of the stop pin 56; in this manner, the working travel of the pawl at each actuation thereof may be varied to adjust the amount of food which is forced from the cutter screen for subsequent cutting off by means of the knife 28, it being noted that the knife and feeding means now described are operative alternately as the cam shaft 34 is rotated.

It will now be noted that the present machine is particularly arranged for cutting such food materials as raw vegetables, cheese, butter and the like into pieces, the shape and size of said pieces being determined by the choice of cutter screens and the setting of the stop pin 56. Since cut-up vegetables and the like present the best possible appearance when all the pieces are of like size and shape, means are preferably provided for use with the machine to eliminate the making of odd-shaped pieces which are in the nature of trimmings. The means provided are arranged for use in "squaring-off" the food to be cut before it is placed in the trough, and a typical embodiment of a shaper 61 for the purpose is disclosed. As particularly shown, the shaper 61 comprises a pair of longitudinal members 62 and a pair of cross members 63, said members cooperative to provide a rectangular frame. Blades 64 and 65 respectively extend from the inner faces of the members 62 and 63, and transversely of the frame plane to define a rectangular space 66. The blades 65 abut the blades 64 and are preferably interlocked with the latter blades as shown, whereby any mutual spreading of the blades may be prevented. The free edges of the blades 64 and 65 are sharpened and define a common plane. To use the shaper it is merely necessary to transversely force the same downwardly upon and through an article to be shaped for trimming four sides thereof. A 90 degree rotation of the article and a second application of the shaper will complete the squaring-off of the article into a rectangle which either alone or with other like rectangles, may be placed in the trough for cutting up into the smaller pieces desired.

Since food products, as they naturally occur vary somewhat in size, a variation in the spacing of the blades 65 may be desirable; to this end at least one of the cross members 63 may be adjustable along the members 62. As shown, one member 63 is arranged for securing in adjusted position on the member 62 by means of thumb screws 67 extending through the member and threadedly engaging appropriate threaded perforations through the member 62; in this manner, food pieces of different size may be provided for insertion in the trough of the machine. Preferably, and as shown, the cross members 63 of the shaper are formed to provide handles whereby a manual manipulation of the shaper to square-off a food article may be facilitated. It will be obvious that for many kinds of foods the preliminary use of the shaper 61 for preparing the food for cutting in the cutter will be essential and that in such cases said shaper comprises a necessary part of the disclosed apparatus.

As particularly shown, a guard casing 71 of suitable shape is provided for mounting at and forwardly of the cutter screen and knife, whereby to protect an operator and insure a solely dropping delivery of the cut-up food from the machine.

The food cutting apparatus now described may be used in the preparation of a wide variety of foods for consumption, and the general operation thereof will be obvious. By way of illustration as to typical uses of the machine, it is noted that a raw potato which has been trimmed to a rectangle by use of the shaper 61 and then placed in the trough 14, may be variously cut entirely in accordance with the choice of cutter screens which is made. With the cutter screen 17 in use, the potato, by proper adjustment of the stop pin 56 which controls the pawl structure, may be diced or cut into thin slices of square outline or cut in long strips for deep fat frying. When the cutter 23 is in use, slicing to produce pieces for pan frying would usually be effected. The cutter 24 would be generally used for "dicing" the potato (or carrots, beets, etc.). When the cutter screen 25 is in use the flat sheets of potato emerging therefrom would be split by the knife 28 to provide a "shoe-string" cutting of the potato.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. In a cutter of the class described, a stationary trough, cutter means at an end of said trough, a plunger engaging behind the material in the trough for intermittent advancement toward said cutter means and having a push rod extending rearwardly therefrom, ratchet teeth provided in and extending across a face of said rod, a pawl engaging said teeth and mounted for oscillation about an axis eccentric and parallel to its pivotal axis, a cam shaft for continuous rotation, cam means on said shaft to intermittently effect an oscillation of said pawl to and from the cutter means for advancing said plunger as said shaft is rotated, and means to adjustably vary the degree of oscillation of said pawl.

2. In a device of the character described, a stationary trough, a cutter screen fixed across said trough and arranged to have material in the trough forced therethrough for cutting the same longitudinally of the trough axis, a plunger engageable behind the material in the trough for intermittent advancement toward and through said cutter screen, a rock-shaft journalled on said trough for oscillation about an axis parallel to the longitudinal axis of the trough, a knife blade fixed to and extending radially from said shaft for operation in the plane of emergence of material from said cutter screen, a cam shaft mounted on said trough for continuous rotation, and means including cams of said shaft to alternately and independently actuate said rock-shaft and plunger.

JOHN FAILLERS.